(12) United States Patent
Wang et al.

(10) Patent No.: US 11,243,552 B1
(45) Date of Patent: Feb. 8, 2022

(54) VOLTAGE DIVIDER CIRCUIT REGARDING BATTERY VOLTAGE, AND ASSOCIATED ELECTRONIC DEVICE EQUIPPED WITH VOLTAGE DIVIDER CIRCUIT

(71) Applicant: Artery Technology Co., Ltd., Chongqing (CN)

(72) Inventors: Zhengxiang Wang, Chongqing (CN); Jiangwei Liu, Chongqing (CN); Chao Li, Chongqing (CN)

(73) Assignee: Artery Technology Co., Ltd., Chongqing (CN)

( * ) Notice: Subject to any disclaimer, the term of this patent is extended or adjusted under 35 U.S.C. 154(b) by 0 days.

(21) Appl. No.: 17/209,248

(22) Filed: Mar. 23, 2021

(30) Foreign Application Priority Data

Jul. 24, 2020 (CN) .......................... 202010721834.7

(51) Int. Cl.
  *H03K 5/003* (2006.01)
  *G05F 1/56* (2006.01)
  *H02J 7/00* (2006.01)

(52) U.S. Cl.
  CPC .............. *G05F 1/56* (2013.01); *H02J 7/0063* (2013.01)

(58) Field of Classification Search
  None
  See application file for complete search history.

(56) References Cited

U.S. PATENT DOCUMENTS

| | | | |
|---|---|---|---|
| 6,489,759 B1 * | 12/2002 | Acharya | G05F 1/46 323/297 |
| 6,683,481 B1 | 1/2004 | Zhou | |
| 7,825,718 B2 * | 11/2010 | Shin | G11C 5/143 327/536 |
| 7,893,715 B2 * | 2/2011 | Barrenscheen | H03K 19/018507 326/80 |
| 9,341,680 B2 * | 5/2016 | Ananth | G01R 31/3835 |
| 9,430,032 B2 * | 8/2016 | Hong | G06F 1/3287 |
| 9,831,867 B1 * | 11/2017 | Kinzer | H03K 17/26 |
| 10,270,448 B1 * | 4/2019 | Blutman | H03K 19/00369 |

(Continued)

FOREIGN PATENT DOCUMENTS

| | | |
|---|---|---|
| TW | 200419883 | 10/2004 |
| TW | 200947862 | 11/2009 |

(Continued)

*Primary Examiner* — Thomas J. Hiltunen
(74) *Attorney, Agent, or Firm* — Winston Hsu

(57) ABSTRACT

A voltage divider circuit regarding a battery voltage and an associated electronic device equipped with the voltage divider circuit are provided. The voltage divider circuit may include a first level shifter circuit, a second level shifter circuit and a controlled voltage divider. The first level shifter circuit selectively performs a first level shifting operation on an original enable signal according to respective voltage levels of multiple control signals to generate a first enable signal. The second level shifter circuit selectively performs a second level shifting operation on the first enable signal according to a voltage level of the first enable signal to generate a second enable signal. The controlled voltage divider selectively performs a voltage dividing operation on the battery voltage according to a voltage level of the second enable signal to generate a divided voltage of the battery voltage to be an output of the voltage divider circuit.

14 Claims, 8 Drawing Sheets

(56) References Cited

U.S. PATENT DOCUMENTS

| | | |
|---|---|---|
| 2007/0285083 A1 | 12/2007 | Kamata |
| 2012/0008431 A1* | 1/2012 | Lee .......................... H03K 5/08 |
| | | 365/191 |
| 2015/0115900 A1 | 4/2015 | Ananth |
| 2015/0263731 A1* | 9/2015 | Kushiyama ........ H03K 19/0185 |
| | | 327/333 |
| 2017/0302069 A1 | 10/2017 | Muramoto |
| 2020/0313662 A1* | 10/2020 | Chen ................ H03K 3/356104 |

FOREIGN PATENT DOCUMENTS

| | | |
|---|---|---|
| TW | 201438400 A | 10/2014 |
| TW | 202107235 A | 2/2021 |

\* cited by examiner

VOLTAGE DIVIDER CIRCUIT REGARDING BATTERY VOLTAGE, AND ASSOCIATED ELECTRONIC DEVICE EQUIPPED WITH VOLTAGE DIVIDER CIRCUIT

BACKGROUND OF THE INVENTION

1. Field of the Invention

The present invention is related to voltage control, and more particularly, to a voltage divider circuit regarding a battery voltage and an associated electronic device equipped with the voltage divider circuit.

2. Description of the Prior Art

Various voltage divider circuits for the battery voltage in a portable electronic device have been proposed in the related art, but there are some problems. For example, a first voltage divider circuit may have at least one external Metal-Oxide-Semiconductor Field Effect Transistor (MOSFET) and at least one external resistor that are located outside of a chip, and at least one additional current path is added, where implementing the aforementioned at least one external MOSFET and the at least one external resistor will increase associated costs, and the current leakage caused by the at least one additional current path will lead to increased power consumption. For another example, a second voltage divider circuit may have some components integrated into a chip, but it is not robust to complicated working modes of a microcontroller. Therefore, there is a need for an integrated voltage divider circuit that is robust to various working modes of the microcontroller to enhance the overall performance of the portable electronic device.

SUMMARY OF THE INVENTION

It is an objective of the present invention to provide a voltage divider circuit regarding a battery voltage, and an associated electronic device equipped with the voltage divider circuit, in order to solve the above-mentioned problems.

It is another objective of the present invention to provide a voltage divider circuit regarding a battery voltage, and an associated electronic device equipped with the voltage divider circuit, in order to achieve optimal performance of the electronic device without introducing any side effect or in a way that is less likely to introduce a side effect.

At least one embodiment of the present invention provides a voltage divider circuit regarding a battery voltage, where the voltage divider circuit is positioned in an electronic device, and the battery voltage is a voltage of a battery of the electronic device. The voltage divider circuit may comprise a first level shifter circuit that operates based on a first power voltage of the electronic device, and comprise a second level shifter circuit and a controlled voltage divider that operate based on the battery voltage. The second level shifter circuit is coupled to the first level shifter circuit, and the controlled voltage divider is coupled to the second level shifter circuit. For example, the first level shifter circuit can be arranged to receive a plurality of control signals generated in the electronic device, and selectively perform a first level shifting operation on an original enable signal according to respective voltage levels of the plurality of control signals to generate a first enable signal in a voltage domain of the first power voltage, for performing enabling control for the voltage divider circuit. In addition, the second level shifter circuit can be arranged to receive the first enable signal, and selectively perform a second level shifting operation on the first enable signal according to a voltage level of the first enable signal to generate a second enable signal in a voltage domain of the battery voltage, for performing enabling control for the voltage divider circuit. Additionally, the controlled voltage divider can be arranged to receive the second enable signal, and selectively perform a voltage dividing operation on the battery voltage according to a voltage level of the second enable signal to generate a divided voltage of the battery voltage to be an output of the voltage divider circuit.

At least one embodiment of the present invention provides the electronic device equipped with the voltage divider circuit mentioned above. The electronic device may further comprise: a microcontroller, arranged to control operations of the electronic device; at least one control signal generator, arranged to generate the plurality of control signals; and at least one power supply circuit, arranged to generate at least the first power voltage.

In comparison with the conventional architecture, the voltage divider circuit of the present invention is robust to various working modes of the microcontroller, and does not require external MOSFETs and external resistors when implemented as an integrated voltage divider circuit. In addition, implementing the embodiments of the present invention can achieve the goals of low cost and low leakage current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
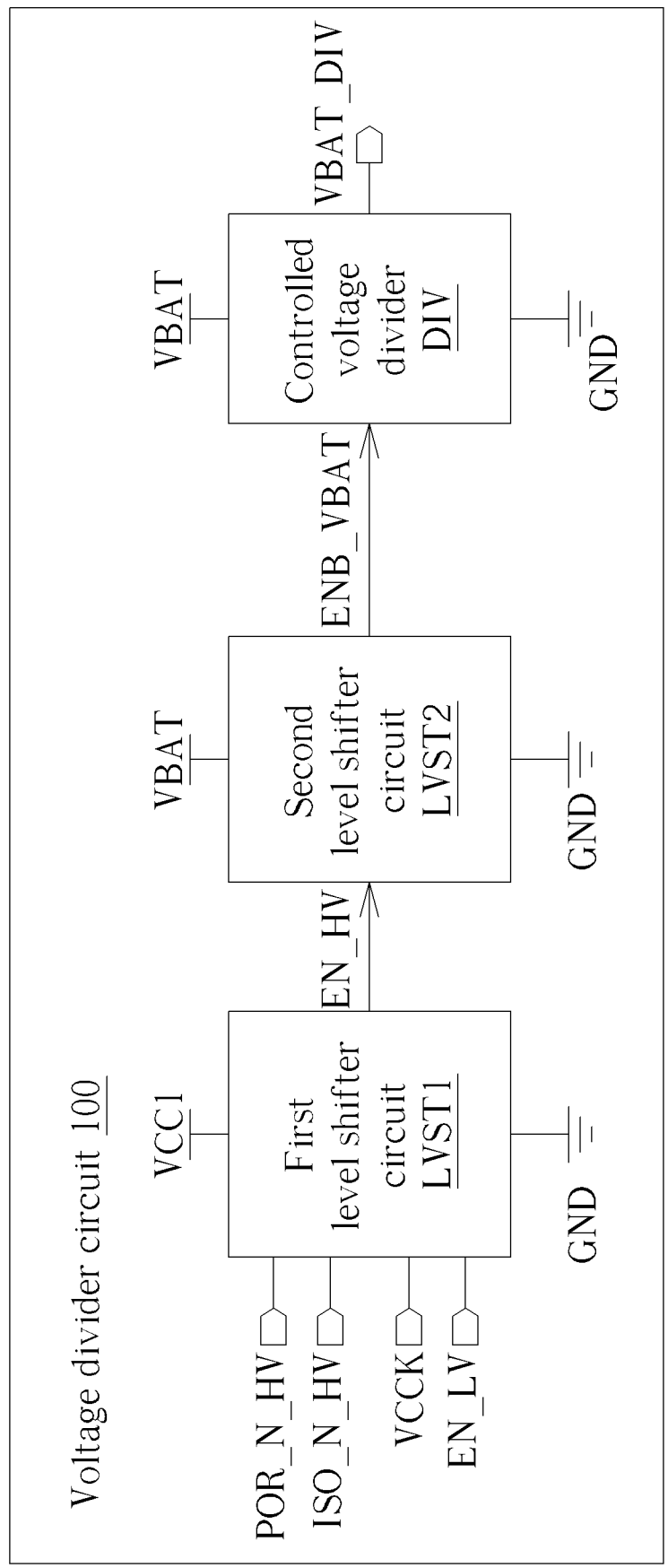
FIG. 1 is a diagram of a voltage divider circuit regarding a battery voltage according to an embodiment of the invention.

FIG. 1 is a diagram of a voltage divider circuit 100 regarding a battery voltage VBAT according to an embodiment of the invention, where the voltage divider circuit 100 may be positioned in an electronic device, and the battery voltage VBAT may be the voltage of the battery of the electronic device. As shown in FIG. 1, the voltage divider circuit 100 may comprise a first level shifter circuit LVST1 that operates based on a power voltage VCC1 of the electronic device, and comprises a second level shifter circuit LVST1 and a controlled voltage divider DIV that operate based on the battery voltage VBAT. The second level shifter circuit LVST2 can be coupled to the first level shifter circuit LVST1, and the controlled voltage divider DIV can be coupled to the second level shifter circuit LVST2.

According to this embodiment, the first level shifter circuit LVST1 can receive a plurality of control signals generated in the electronic device, such as a power-on reset (POR) signal POR_N_HV and an isolation signal ISO_N_HV of a microcontroller (not shown in FIG. 1) of the electronic device, where the power-on reset signal POR_N_HV can be configured to control the power-on reset of the electronic device and the isolation signal ISO_N_HV can be configured to control the power isolation of the microcontroller. The first level shifter circuit LVST1 can selectively perform a first level shifting operation on an original enable signal EN_LV in the voltage domain DOMAIN_VCCK of the power voltage VCCK (not shown in FIG. 1) according to the respective voltage levels of the plurality of control signals to generate a first enable signal EN_HV in the voltage domain DOMAIN_VCC1 of the power voltage VCC1, for performing enabling control of the voltage divider circuit 100. For example, the voltage level of the first enable signal EN_HV may be limited by the voltage level of the power voltage VCC1. In particular, the high voltage level of the first enable signal EN_HV may be equal to or slightly less than the voltage level of the power voltage VCC1. In addition, the second level shifter circuit LVST2 can receive the first enable signal EN_HV, and selectively perform a second level shifting operation on the first enable signal EN_HV according to the voltage level of the first enable signal EN_HV to generate a second enable signal ENB_VBAT in the voltage domain DOMAIN_VBAT of the battery voltage VBAT, for performing enabling control of the voltage divider circuit 100. For example, the voltage level of the second enable signal ENB_VBAT may be limited by the voltage level of the battery voltage VBAT. In particular, the high voltage level of the second enable signal ENB_VBAT may be equal to or slightly less than the voltage level of the battery voltage VBAT. Additionally, the controlled voltage divider DIV can receive the second enable signal ENB_VBAT, and selectively perform a voltage dividing operation on the battery voltage VBAT according to the voltage level of the second enable signal ENB_VBAT to generate the divided voltage VBAT_DIV of the battery voltage VBAT to be the output of the voltage divider circuit 100.

For better comprehension, the original enable signal EN_LV and the first enable signal EN_HV can be active high, and the high logic level "1" and the low logic level "0" (e.g. the high voltage level and the low voltage level) of each signal of these signals may represent enabling and disabling the function controlled by this signal, respectively, where the first level shifter circuit LVST1 can convert the high logic level "1" and the low logic level "0" of the original enable signal EN_LV in the voltage domain DOMAIN_VCCK into the high logic level "1" and the low logic level "0" of the first enable signal EN_HV in the voltage domain DOMAIN_VCC1, respectively, but the present invention is not limited thereto. In addition, the second enable signal ENB_VBAT can be active low, and the low logic level "0" and the high logic level "1" (e.g. low voltage level and the high voltage level) of the second enable signal ENB_VBAT may represent enabling and disabling the function controlled by this signal, respectively, where the second level shifter circuit LVST2 can convert the high logic level "1" and the low logic level "0" of the first enable signal EN_HV in the voltage domain DOMAIN_VCC1 into the low logic level "0" and the high logic level "1" of the second enable signal ENB_VBAT in the voltage domain DOMAIN_VBAT, respectively, but the present invention is not limited thereto. According to some embodiments, the original enable signal EN_LV, the first enable signal EN_HV, and the second enable signal ENB_VBAT may vary. For example, any signal of the original enable signal EN_LV and the first enable signal EN_HV can be implemented as active low. For another example, the second enable signal ENB_VBAT can be implemented as active high.

According to some embodiments, the voltage divider circuit 100 can operate according to a first reference voltage such as the ground voltage GND and a plurality of second reference voltages such as the battery voltage VBAT and the power voltages VCC1, VCCK, etc. For example, the power voltages VCC1 and VCCK may respectively represent the main power and the core power of the microcontroller, and the respective voltage domains DOMAIN_VCC1 and DOMAIN_VCCK of the power voltages VCC1 and VCCK may be referred to as the main voltage domain and the core voltage domain, respectively, where the power voltage VCC1 is typically greater than the power voltage VCCK, and the electronic device can utilize a voltage regulator therein, such as a low dropout (LDO) regulator, to regulate the power voltage VCC1 to generate the power voltage VCCK as the core power, for driving the digital domain of the microcontroller. In addition, the original enable signal EN_LV, the first enable signal EN_HV, and the second enable signal ENB_VBAT can be regarded as voltage divider enable signals, and more particularly, can be voltage divider enable signals corresponding to different voltage domains DOMAIN_VCCK, DOMAIN_VCC1, and DOMAIN_VBAT, respectively. For example, the original enable signal EN_LV can be a software command signal received from the microcontroller.

According to some embodiments, the voltage divider circuit 100 may comprise transistors of different types of channels, such as transistors belonging to a first type and a second type, respectively. For example, subsequent embodiments indicate that the architecture shown in FIG. 1 can use some types of Metal-Oxide-Semiconductor Field Effect Transistors (MOSFETs), such as P-type MOSFETs and N-type MOSFETs, but the present invention is not limited thereto.

Figure 2:
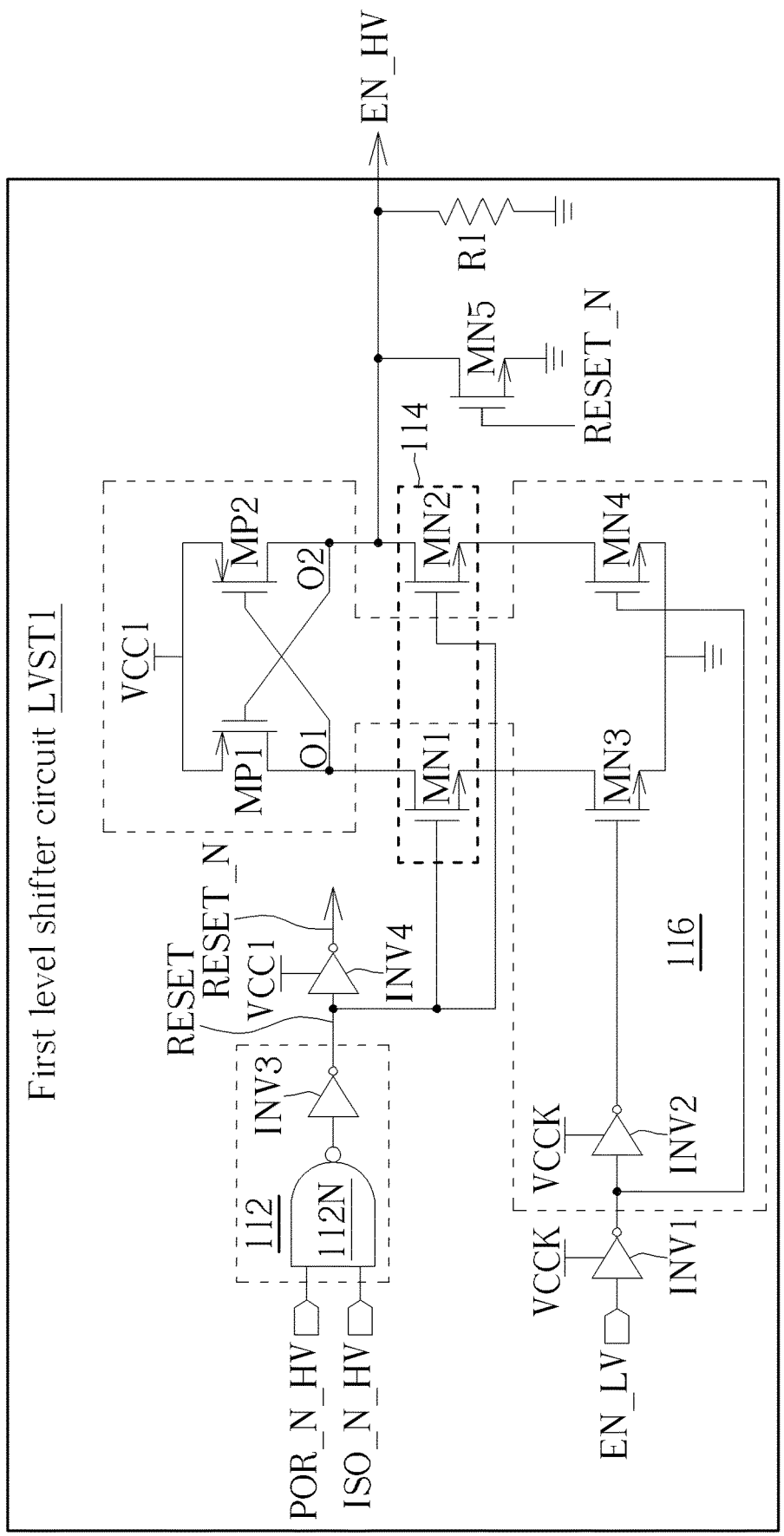
FIG. 2 illustrates some implementation details of a first level shifter circuit in the voltage divider circuit shown in FIG. 1 according to an embodiment of the present invention.

FIG. 2 illustrates some implementation details of a first level shifter circuit LVST1 in the voltage divider circuit 100 shown in FIG. 1 according to an embodiment of the present invention. The first level shifter circuit LVST1 may comprise at least one logic circuit (e.g. one or more logic circuits) which may be collectively referred to as the logic circuit 112, at least one switch (e.g. one or more switches) which is coupled to the logic circuit 112 and may be collectively referred to as the switch 114, and a first level shifter 116 coupled to the switch 114. For example, the logic circuit 112 may comprise a NAND gate 112N and an inverter INV3 coupled to the NAND gate 112N, the switch 114 may comprise transistors MN1 and MN2, and the first level shifter 116 may comprise transistors MP1, MP2, MN3, and MN4, and an inverter INV2, where the respective control terminals of the transistors MP2 and MP1, such as the gate terminals thereof, are respectively coupled to the nodes O1 and O2 below the transistors MP1 and MP2, and the respective control terminals of the transistors MN4 and MN3, such as the gate terminals thereof, are respectively coupled to the input terminal and the output terminal of the inverter INV2. The first level shifter circuit LVST1 may further comprise inverters INV1 and INV4 respectively coupled to the inverter INV1 and the original enable signal EN_LV, another switch such as a transistor MN5, and a resistor R1. The input terminal of the first level shifter 116, such as the input terminal of the inverter INV2, is coupled to the output terminal of the inverter INV1, and the respective first terminals of the transistor MN5 and the resistor R1 are coupled to the output terminal of the first level shifter 116, such as a terminal positioned at or near the node O2, and the control terminal of the transistor MN5, such as the gate terminal thereof, is coupled to the output terminal of the inverter INV4.

The logic circuit 112 can be configured to perform logic control according to the power-on reset signal POR_N_HV and the isolation signal ISO_N_HV to generate at least one logic signal such as the reset signal RESET, and the aforementioned at least one switch such as the transistors MN1 and MN2 can be configured to operate according to the at least one logic signal such as the reset signal RESET to selectively make at least one signal path such as a first signal path between the transistors MP1 and MN3 and a second signal path between the transistors MP2 and MN4 be conductive, and the first level shifter 116 can be configured to, under the control of the switch 114, selectively perform the first level shifting operation on the original enable signal EN_LV to generate the first enable signal EN_HV, wherein whether the first level shifter 116 performs the first level shifting operation on the original enable signal EN_LV corresponds to whether the switch 114 makes the aforementioned at least one signal path such as the first signal path and the second signal path be conductive. When the switch 114 makes the aforementioned at least one signal path be conductive, the first level shifter 116 performs the first level shifting operation on the original enable signal EN_LV to generate the first enable signal EN_HV, such as the first enable signal EN_HV carrying the high logic level "1". For example, when the power-on reset signal POR_N_HV indicates a power-on reset phase of the electronic device, the logic circuit 112 can control the switch 114 through the aforementioned at least one logic signal such as the reset signal RESET to prevent making the aforementioned at least one signal path be conductive. When the isolation signal ISO_N_HV indicates a standby mode of the electronic device, the logic circuit 112 can control the switch 114 through the aforementioned at least one logic signal such as the reset signal RESET to prevent making the aforementioned at least one signal path be conductive.

More particularly, in the logic circuit 112, the NAND gate 112N can generate a first logic signal according to the power-on reset signal POR_N_HV and the isolation signal ISO_N_HV, and the inverter INV3 can generate the inverted signal of the first logic signal according to the first logic signal to be the above-mentioned at least one logic signal such as a reset signal RESET. Thus, if the power-on reset signal POR_N_HV indicates the power-on reset phase of the electronic device or the isolation signal ISO_N_HV indicates the standby mode of the electronic device, the logic circuit 112 can control the switch 114 through the aforementioned at least one logic signal such as the reset signal RESET to prevent making the aforementioned at least one signal path be conductive, to reset the first level shifter 116; otherwise, the logic circuit 112 can control the switch 114 through the aforementioned at least one logic signal such as the reset signal RESET to make the aforementioned at least one signal path be conductive, to allow the first level shifter circuit LVST1 to perform the first level shifting operation on the original enable signal EN_LV to generate the first enable signal EN_HV. For example, the power-on reset signal POR_N_HV, the isolation signal ISO_N_HV, and the reset signal RESET can be active low, and the low logic level "0" and the high logic level "1" (e.g. the low voltage level and the high voltage level) of each signal of these signals may represent enabling and disabling the function controlled by this signal, respectively; and the reset signal RESET_N (such as the inverted signal of the reset signal RESET) can be active high, and the high logic level "1" and the low logic level "0" (e.g. the high voltage level and the low voltage level) of the reset signal RESET_N may represent enabling and disabling the function controlled by this signal, respectively. When the power-on reset signal POR_N_HV carries the low logic level "0" (which may indicate that the electronic device is in the power-on reset phase) and/or the isolation signal ISO_N_HV carries the low logic level "0" (which may indicate the power isolation of the microcontroller, for example, the electronic device is in the standby mode), the reset signals RESET and RESET_N can respectively carry the low logic level "0" and the high logic level "1" to reset the first level shifter 116; otherwise, in a situation where both of the transistors MN1 and MN2 are turned on to make the respective lower terminals of the transistors MP1 and MP2 (or the nodes O1 and O2) be respectively conducted to the respective upper terminals of the transistors MN3 and MN4, the first level shifter 116 can operate normally to allow the first level shifter circuit LVST1 to perform the first level shifting operation on the original enable signal EN_LV to generate the first enable signal EN_HV in the voltage domain DOMAIN_VCC1 of the power voltage VCC1.

Figure 3:
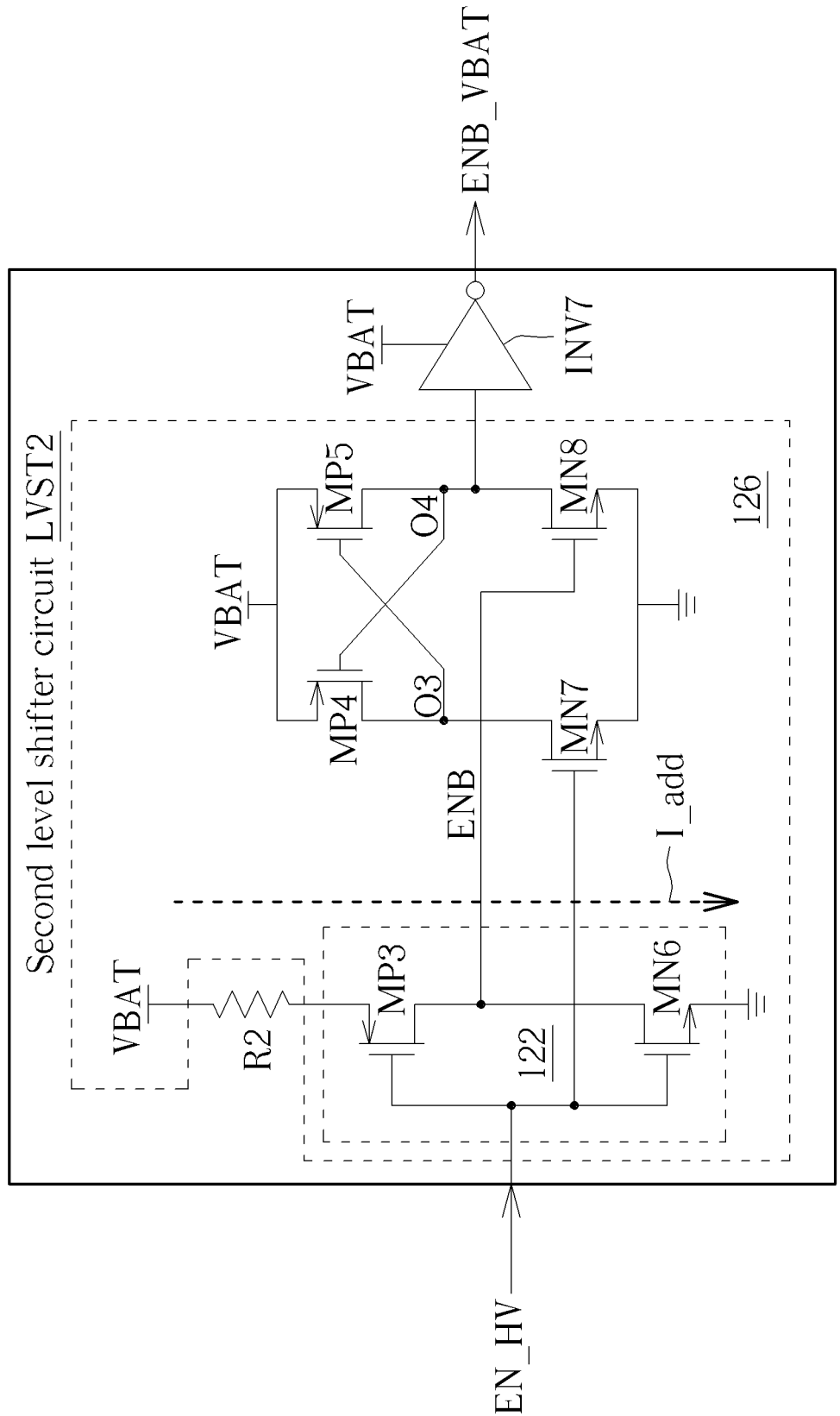
FIG. 3 illustrates some implementation details of a second level shifter circuit in the voltage divider circuit shown in FIG. 1 according to an embodiment of the present invention.

FIG. 3 illustrates some implementation details of a second level shifter circuit LVST2 in the voltage divider circuit 100 shown in FIG. 1 according to an embodiment of the present invention. The second level shifter circuit LVST2 may comprise a second level shifter 126 coupled to the first level shifter circuit LVST1, and a resistor R2 installed on the second level shifter 126, and comprises an inverter INV7 coupled to the second level shifter 126. The second level shifter 126 may comprise transistors MP4, MP5, MN7, and MN8, and comprises a set of transistors MP3 and MN6 coupled to each other and coupled between the battery voltage VBAT and the ground voltage GND, to form an inverter 122 in the second level shifter 126, where the respective control terminals of the transistors MP5 and MP4, such as the gate terminals thereof, are respectively coupled to the nodes O3 and O4 below the transistors MP4 and MP5, and the respective control terminals of the transistor MN7 and MN8, such as the gate terminals thereof, are respectively coupled to the input terminal and output terminal of the inverter 122, to receive the first enable signal EN_HV and the inverted signal ENB thereof, respectively. The second level shifter circuit LVST2 can utilize the second level shifter 126 to selectively perform the second level shifting operation on the first enable signal EN_HV according to the voltage level of the first enable signal EN_HV to generate an intermediate enable signal on the node O4, and utilize the inverter INV7 to invert the intermediate enable signal to generate the inverted signal of the intermediate enable signal to be the second enable signal ENB_VBAT. In addition, the resistor R2 is installed on a current path that passes through the set of transistors MP3 and MN6 and is positioned between the battery voltage VBAT and the ground voltage GND. The resistor R2 can be configured to limit any possible leakage current I_add on this current path for at least one operation mode of multiple operation modes of the electronic device. The parameters (e.g. sizes) of the resistor R2 and the transistor MP3 can be properly designed to block any possible leakage current I_add, in particular, when VCC1<VBAT. For example, the leakage current I_add can be expressed with the following equation:

$$I\_add=(VBAT-VCC1-Vthp)/R2;$$

where Vthp represents the threshold voltage of the transistor MP3, such as 0.5 Volt (V), but the present invention is not limited thereto. According to some embodiments, the threshold voltage may vary.

Figure 4:
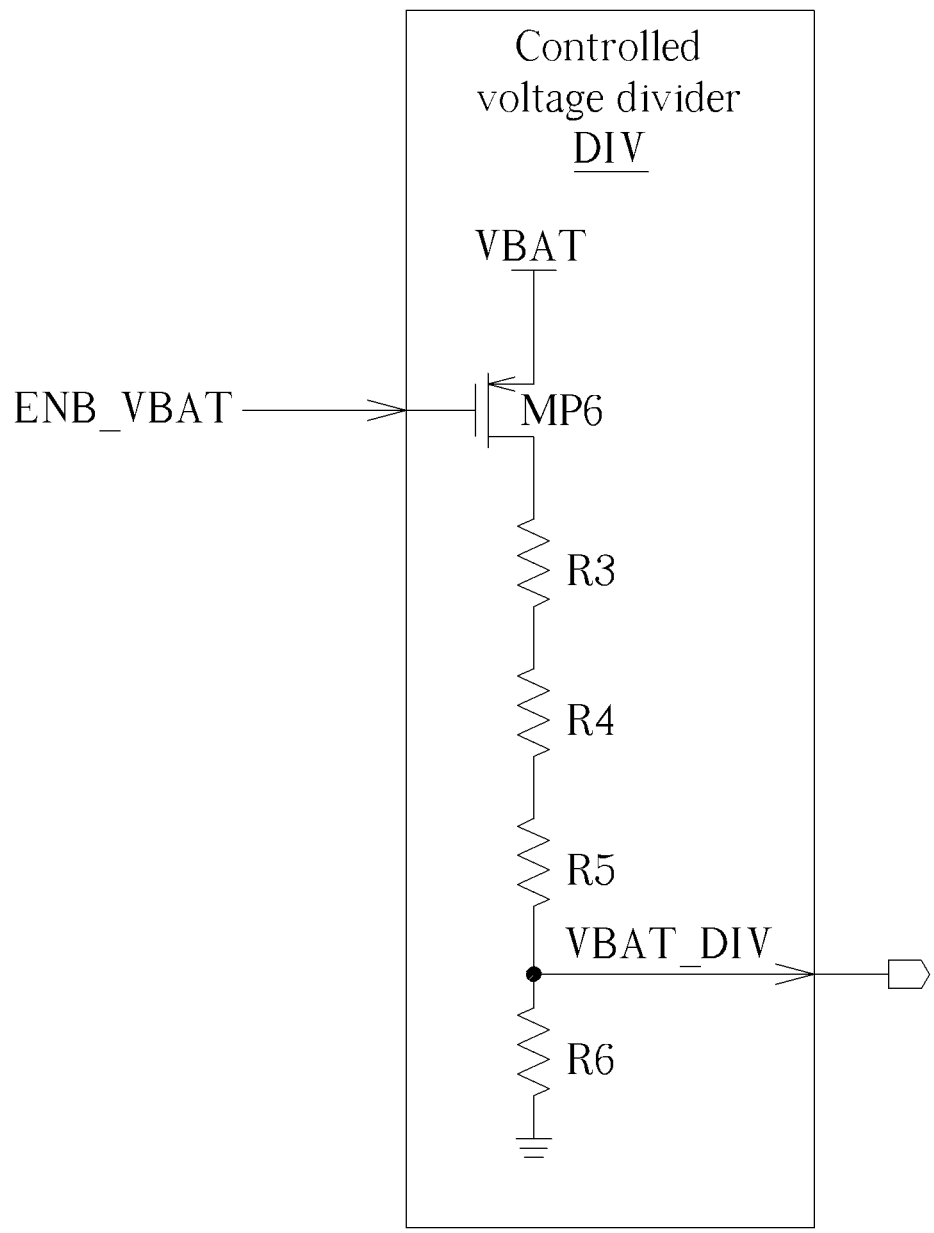
FIG. 4 illustrates some implementation details of a controlled voltage divider in the voltage divider circuit shown in FIG. 1 according to an embodiment of the present invention.

FIG. 4 illustrates some implementation details of a controlled voltage divider DIV in the voltage divider circuit 100 shown in FIG. 1 according to an embodiment of the present invention. The controlled voltage divider DIV may comprise a set of resistors connected in series and coupled between the battery voltage VBAT and the ground voltage GND, such as the resistors {R3, R4, R5, R6}, and comprise a switch installed on a current path that passes through the set of transistors and is positioned between the battery voltage VBAT and the ground voltage GND, such as the transistor MP6, where the respective resistance values of the resistors {R3, R4, R5, R6} can be equal to each other, but the present invention is not limited thereto. For example, the type of the switch such as the transistor MP6, the number of resistors in the set of resistors, the resistance values of the resistors in the set of resistors, and/or the position of the switch on the current path may vary. In addition, the set of resistors such as the resistors {R3, R4, R5, R6} can be configured to selectively perform the voltage dividing operation on the battery voltage VBAT to generate the divided voltage VBAT_DIV of the battery voltage VBAT to be the output of the voltage divider circuit 100. This switch such as the transistor MP6 can be configured to operate according to the second enable signal ENB_VBAT to selectively make this current path be conductive.

According to the architecture shown in FIGS. 2-4, when any signal of the power-on reset signal POR_N_HV and the isolation signal ISO_N_HV carries the low logic level "0", the reset signal RESET carries the low logic level "0" to turn off the transistors MN1 and MN2, and the reset signal RESET_N carries the high logic level "1" to turn on the transistor MN5, to make the first enable signal EN_HV carry the low logic level "0" (e.g., be equal to or slightly greater than the ground voltage GND) to turn on the transistor MP3 and turn off the transistors MN6 and MN7, where the inverted signal ENB of the first enable signal EN_HV carries the high logic level "1" to turn on the transistor MN8. In this situation, the respective voltage levels of the nodes O3 and O4 are the high logic level "1" and the low logic level "0" respectively. As the intermediate enable signal on the node O4 carries the low logic level "0", the second enable signal ENB_VBAT carries the high logic level "1" to turn off the transistor MP6, and therefore turn off the controlled voltage divider DIV. In addition, when each signal of the power-on reset signal POR_N_HV and the isolation signal ISO_N_HV carries the high logic level "1", the reset signal RESET carries the high logic level "1" to turn on the transistors MN1 and MN2, and the reset signal RESET_N carries the low logic level "0" to turn off the transistor MN5, to make the logic level of the first enable signal EN_HV correspond to the logic level of the original enable signal EN_LV. For example, when the original enable signal EN_LV carries the high logic level "1", the first enable signal EN_HV also carries the high logic level "1" (e.g., is equal to or slightly less than the power voltage VCC1) to turn off the transistor MP3 and turn on the transistors MN6 and MN7, where the inverted signal ENB of the first enable signal EN_HV carries the low logic level "0" to turn off the transistor MN8. In this situation, the respective voltage levels of the nodes O3 and O4 are the low logic level "0" and the high logic level "1" respectively. As the intermediate enable signal on the node O4 carries the high logic level "1", the second enable signal ENB_VBAT carries the low logic level "0" to turn on the transistor MP6, and therefore turn on the controlled voltage divider DIV. For another example, when the original enable signal EN_LV carries the low logic level "0", the first enable signal EN_HV also carries the low logic level "0" (e.g., is equal to or slightly greater than the ground voltage GND) to turn on the transistor MP3 and turn off the transistors MN6 and MN7, where the inverted signal ENB of the first enable signal EN_HV carries the high logic level "1" to turn on the transistor MN8. In this situation, the respective voltage levels of the nodes O3 and O4 are the high logic level "1" and the low logic level "0" respectively. As the intermediate enable signal on the node O4 carries the low logic level "0", the second enable signal ENB_VBAT carries the high logic level "1" to turn off the transistor MP6, and therefore turn off the controlled voltage divider DIV.

Based on the embodiments shown in FIGS. 1-4, the multi-stage architecture formed with the first level shifter circuit LVST1, the second level shifter circuit LVST2, and the controlled voltage divider DIV allows the whole of the voltage divider circuit 100 to be implemented in a chip without need of any external components outside the chip. In comparison with the conventional architecture, the voltage divider circuit of the present invention is robust to various working modes of the microcontroller, and does not require external MOSFETs and external resistors when implemented as an integrated voltage divider circuit, and can achieve the goals of low cost and low leakage current.

Figure 5:
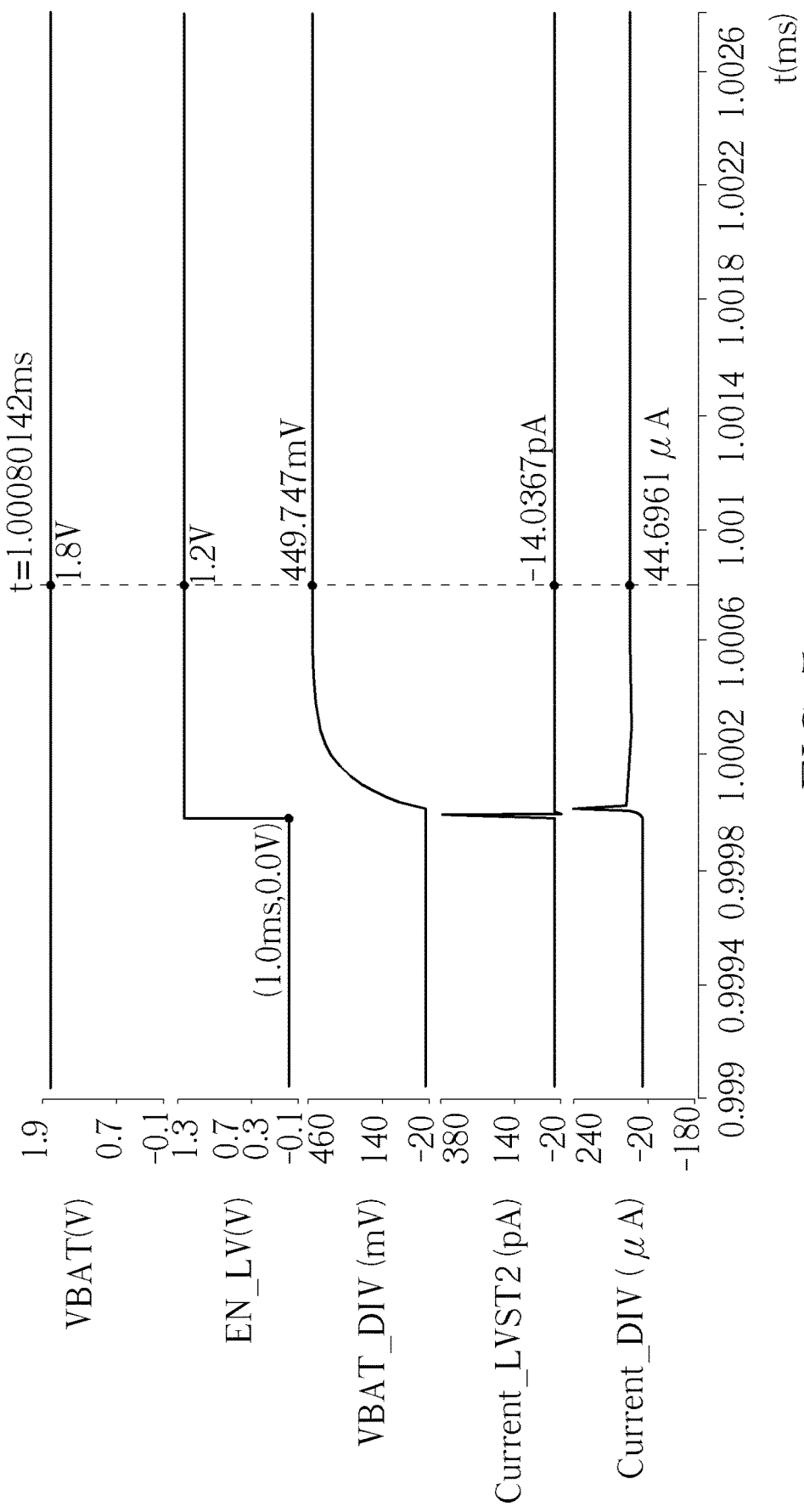
FIG. 5 illustrates some associated signals in the voltage divider circuit shown in FIG. 1 according to an embodiment of the present invention.

FIG. 5 illustrates some associated signals in the voltage divider circuit 100 shown in FIG. 1 according to an embodiment of the present invention, where the horizontal axis t represents time, which can be measured in unit of millisecond (ms). In this embodiment, the battery voltage VBAT and the original enable signal EN_LV are respectively illustrated in unit of volt (V), and the divided voltage VBAT_DIV is illustrated in unit of millivolt (mV), the current Current_LVST2 consumed by the second level shifter circuit LVST2 is illustrated in unit of picoampere (pA), and the current Current_DIV consumed by the controlled voltage divider DIV is illustrated in unit of microampere (μA). For example, VBAT=1.8 V and VCC1=3.6 V. After the original enable signal EN_LV is pulled up from 0.0 V at t=1.0 ms, the battery voltage VBAT, the original enable signal EN_LV, the divided voltage VBAT_DIV, the current Current_LVST2, and the current Current_DIV can be equal to 1.8 V, 1.2 V, 449.747 mV, −14.0367 pA, and 44.6961 μA at t=1.00080142 ms, respectively.

Figure 6:
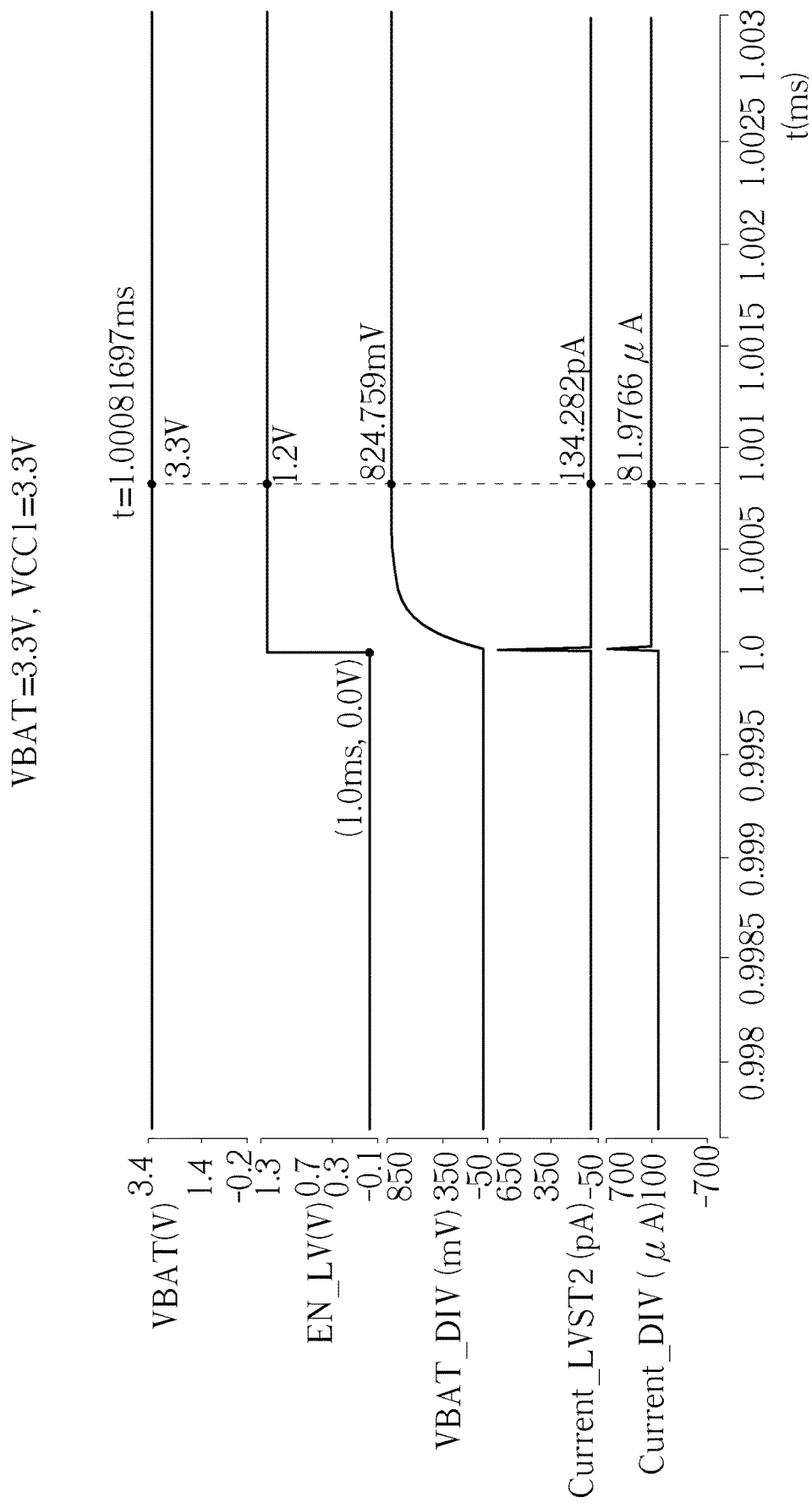
FIG. 6 illustrates some associated signals in the voltage divider circuit shown in FIG. 1 according to another embodiment of the present invention.

FIG. 6 illustrates some associated signals in the voltage divider circuit 100 shown in FIG. 1 according to another embodiment of the present invention, where the horizontal axis t represents time, which can be measured in unit of millisecond (ms). In this embodiment, the battery voltage VBAT and the original enable signal EN_LV are respectively illustrated in unit of volt (V), the divided voltage VBAT_DIV is illustrated in unit of millivolt (mV), the current Current_LVST2 is illustrated in unit of picoampere (pA), and the current Current_DIV is illustrated in unit of microampere (µA). For example, VBAT=3.3 V and VCC1=3.3 V. After the original enable signal EN_LV is pulled up from 0.0 V at t=1.0 ms, the battery voltage VBAT, the original enable signal EN_LV, the divided voltage VBAT_DIV, the current Current_LVST2, and the current Current_DIV can be equal to 3.3 V, 1.2 V, 824.759 mV, 134.282 pA, and 81.9766 µA at t=1.00081697 ms, respectively.

Figure 7:
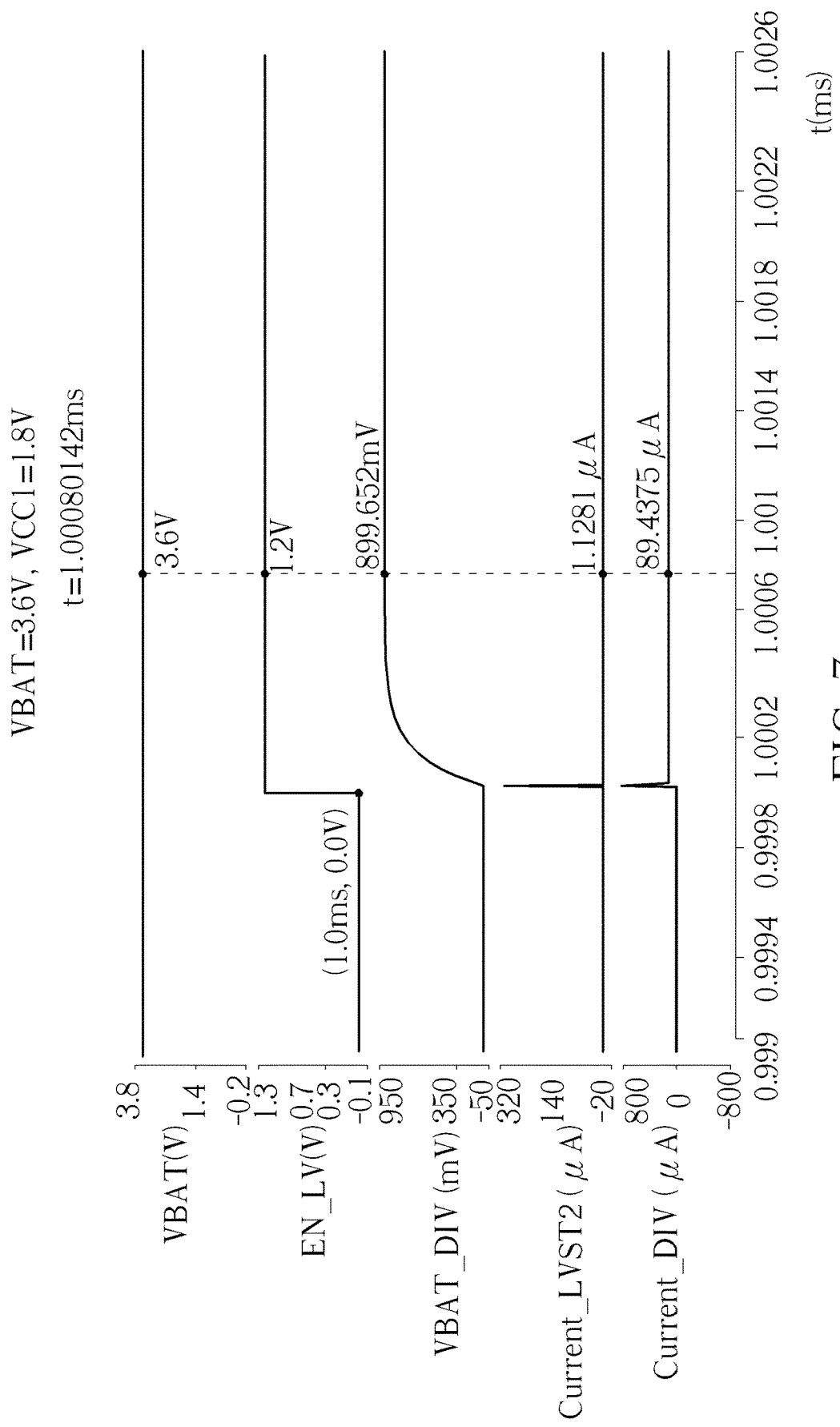
FIG. 7 illustrates some associated signals in the voltage divider circuit shown in FIG. 1 according to another embodiment of the present invention.

FIG. 7 illustrates some associated signals in the voltage divider circuit 100 shown in FIG. 1 according to another embodiment of the present invention, where the horizontal axis t represents time, which can be measured in unit of millisecond (ms). In this embodiment, the battery voltage VBAT and the original enable signal EN_LV are respectively illustrated in unit of volt (V), and the divided voltage VBAT_DIV is illustrated in unit of millivolt (mV), and the currents Current_LVST2 and Current_DIV are respectively illustrated in unit of microampere (µA). For example, VBAT=3.6 V and VCC1=1.8 V. After the original enable signal EN_LV is pulled up from 0.0 V at t=1.0 ms, the battery voltage VBAT, the original enable signal EN_LV, the divided voltage VBAT_DIV, the current Current_LVST2, and the current Current_DIV can be equal to 3.6 V, 1.2 V, 899.652 mV, 1.1281 pA, and 89.4375 µA at t=1.00080142 ms, respectively.

According to some embodiments, the current Current_LVST2 may represent the leakage current I_add, where among all cases regarding various relationships between the battery voltage VBAT and the power voltage VCC1 (e.g. VBAT<VCC1, VBAT=VCC1 and VBAT>VCC1), the leakage current I_add in the case of VBAT<VCC1 as shown in FIG. 5 and the case of VBAT=VCC1 as shown in FIG. 6 can be omitted and can be regarded as zero, and only in the case of VBAT>VCC1 as shown in FIG. 7, there is a slight leakage current I_add (e.g. I_add=Current_LVST2=1.1281 µA). Even in the case of VBAT>VCC1, the leakage current I_add can be easily limited by the resistor R2 which has a smaller resistance value than that of the resistor of the conventional architecture. For example, the resistance value of the resistor R2 can be merely 100 kilo-ohm (kΩ). However, in the conventional architecture, to achieve such a small leakage current (e.g. I=1.1281 µA) under the same battery voltage VBAT=3.6 V, the resistance value of the resistor required by the conventional architecture can be expressed as follows:

$$VBAT/I=((3.6\ V)/(1.1281\ \mu A))\approx 3.2\ \text{mega-ohm}\ (M\Omega);$$

where the resistance value of this resistor is very large, which means that an external resistor is required. In addition, the conventional architecture still has significant leakage current when VBAT≤VCC1. Therefore, the voltage divider circuit 100 of the present invention is much better than the conventional architecture, and more particularly, has the advantages of low cost, low leakage current, etc.

Figure 8:
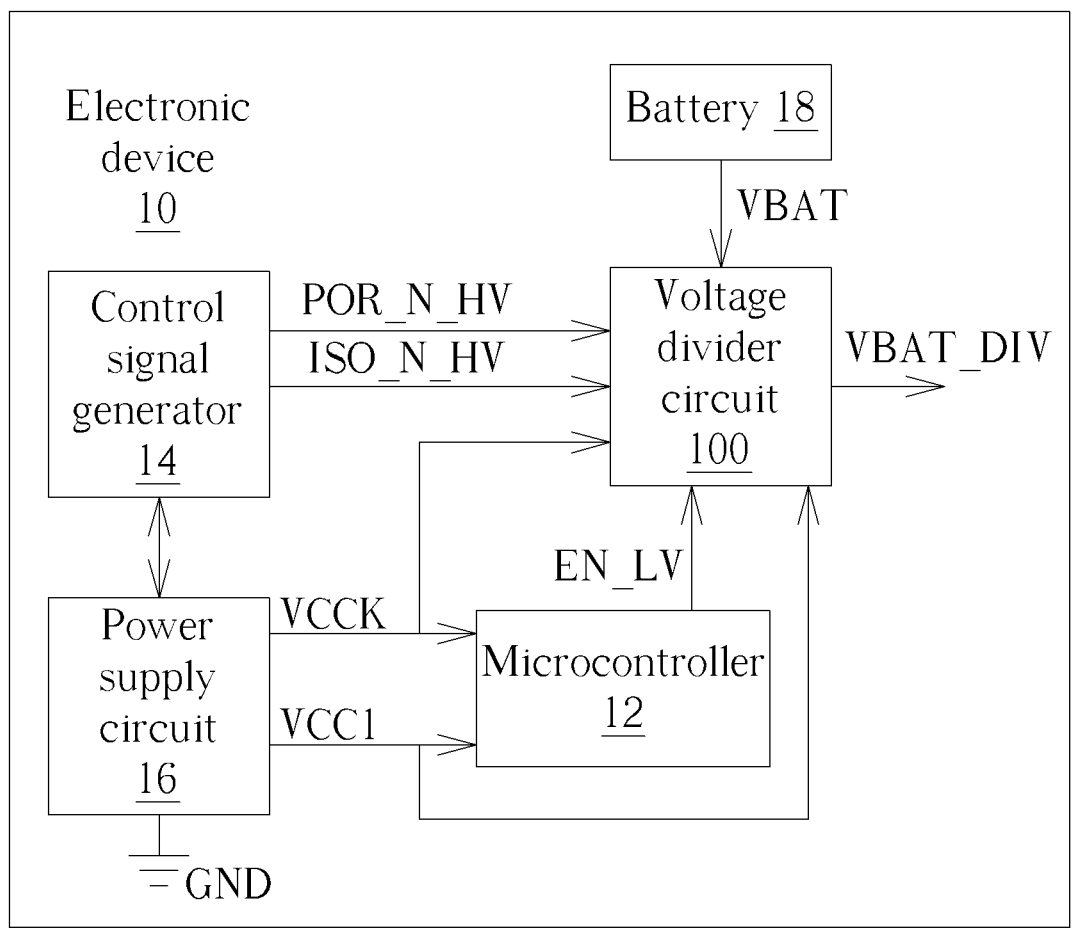
FIG. 8 is a diagram of an electronic device equipped with the voltage divider circuit shown in FIG. 1 according to an embodiment of the present invention.

FIG. 8 is a diagram of an electronic device 10 equipped with the voltage divider circuit 100 shown in FIG. 1 according to an embodiment of the present invention. The electronic device 10 may comprise a microcontroller 12, at least one control signal generator such as the control signal generator 14, at least one power supply circuit such as the power supply circuit 16, a battery 18, and the voltage divider circuit 100, where the electronic device 10, the microcontroller 12 and the battery 18 can be taken as examples of the above-mentioned electronic device, the above-mentioned microcontroller, and the above-mentioned battery, respectively. The microcontroller 12 can be configured to control the operations of the electronic device 10, the control signal generator 14 can be configured to generate the plurality of control signals such as the power-on reset signal POR_N_HV and the isolation signal ISO_N_HV, and the power supply circuit 16 can be configured to generate the power voltages VCC1, VCCK, etc. For example, in a situation where the microcontroller 12 enables the voltage dividing function of the voltage divider circuit 100, the voltage divider circuit 100 outputs the divided voltage VBAT_DIV of the battery voltage VBAT, to allow the electronic device 10 to utilize an analog-to-digital converter (ADC) therein to receive and monitor the divided voltage VBAT_DIV to monitor the battery voltage VBAT without any input signal saturation problem, but the present invention is not limited thereto. In addition, the voltage divider circuit 100 and the microcontroller 12 can be integrated into the same chip (or die), and there is no need to implement any external MOSFET or any external resistor outside this chip (or die) for the voltage divider circuit 100. For brevity, similar descriptions for this embodiment are not repeated in detail here.

The voltage divider circuit of the present invention can prevent any significant leakage current that is common in the related art in various situations. No matter in which of multiple situations of the above-mentioned electronic device, such as the boot-up/power-on/power-on reset (e.g. when the power-on reset signal POR_N_HV carries the low logic level "0", the first enable signal EN_HV carries the low logic level "0"), the standby mode (e.g. when the isolation signal ISO_N_HV carries the low logic level "0", the first enable signal EN_HV carries the low logic level "0"), the battery voltage (VBAT) mode (e.g. when the power voltage VCC1 is turned off or is not ready yet, the resistor R1 pulls down the first enable signal EN_HV to the ground voltage GND, as if it carries the low logic level "0"), etc., the voltage divider circuit 100 can safely set its output to zero without occurrence of any significant leakage current.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage divider circuit regarding a battery voltage, the voltage divider circuit being positioned in an electronic device, the battery voltage being a voltage of a battery of the electronic device, the voltage divider circuit comprising:
   a first level shifter circuit that operates based on a first power voltage of the electronic device, the first level shifter circuit arranged to receive a plurality of control signals generated in the electronic device, and selectively perform a first level shifting operation on an original enable signal according to respective voltage levels of the plurality of control signals to generate a first enable signal in a voltage domain of the first power voltage, for performing enabling control for the voltage divider circuit;
   a second level shifter circuit that operates based on the battery voltage, the second level shifter circuit coupled to the first level shifter circuit, the second level shifter circuit arranged to receive the first enable signal, and selectively perform a second level shifting operation on the first enable signal according to a voltage level of the first enable signal to generate a second enable signal in a voltage domain of the battery voltage, for performing enabling control for the voltage divider circuit; and
   a controlled voltage divider that operates based on the battery voltage, the controlled voltage divider coupled to the second level shifter circuit, the controlled voltage divider arranged to receive the second enable signal, and selectively perform a voltage dividing operation on the battery voltage according to a voltage level of the second enable signal to generate a divided voltage of the battery voltage to be an output of the voltage divider circuit.

2. The voltage divider circuit of claim 1, wherein the first power voltage represents a main power of a microcontroller of the electronic device.

3. The voltage divider circuit of claim 1, wherein the plurality of control signals comprise a power-on reset signal of the electronic device and an isolation signal of a microcontroller of the electronic device, wherein the power-on reset signal is configured to control power-on reset of the electronic device, and the isolation signal is configured to control power isolation of the microcontroller.

4. The voltage divider circuit of claim 3, wherein the first level shifter circuit comprises:
   at least one logic circuit, arranged to perform logic control according to the power-on reset signal and the isolation signal to generate at least one logic signal;
   at least one switch, coupled to the at least one logic circuit, arranged to operate according to the at least one logic signal to selectively make at least one signal path be conductive; and
   a first level shifter, coupled to the at least one switch, arranged to, under control of the at least one switch, selectively perform the first level shifting operation on the original enable signal to generate the first enable signal, wherein whether the first level shifter performs the first level shifting operation on the original enable signal corresponds to whether the at least one switch makes the at least one signal path be conductive.

5. The voltage divider circuit of claim 4, wherein when the power-on reset signal indicates a power-on reset phase of the electronic device, the at least one logic circuit controls the at least one switch through the at least one logic signal to prevent making the at least one signal path be conductive.

6. The voltage divider circuit of claim 4, wherein when the isolation signal indicates a standby mode of the electronic device, the at least one logic circuit controls the at least one switch through the at least one logic signal to prevent making the at least one signal path be conductive.

7. The voltage divider circuit of claim 4, wherein, if the power-on reset signal indicates a power-on reset phase of the electronic device or the isolation signal indicates a standby mode of the electronic device, the at least one logic circuit controls the at least one switch through the at least one logic signal to prevent making the at least one signal path be conductive; otherwise, the at least one logic circuit controls the at least one switch through the at least one logic signal to make the at least one signal path be conductive.

8. The voltage divider circuit of claim 4, wherein the at least one logic circuit comprises:
   a NAND gate, arranged to generate a first logic signal according to the power-on reset signal and the isolation signal; and
   an inverter, coupled to the NAND gate, arranged to generate the at least one logic signal according to the first logic signal.

9. The voltage divider circuit of claim 4, wherein the first level shifter circuit further comprises:
   an inverter, coupled to the at least one logic circuit, arranged to generate another logic signal according to the at least one logic signal; and
   another switch, coupled to the inverter, arranged to operate according to the other logic signal to selectively make a signal path between an output of the first level shifter circuit and a ground voltage be conductive.

10. The voltage divider circuit of claim 4, wherein when the at least one switch makes the at least one signal path be conductive, the first level shifter performs the first level shifting operation on the original enable signal to generate the first enable signal.

11. The voltage divider circuit of claim 1, wherein the second level shifter circuit comprises:
    a second level shifter, coupled to the first level shifter circuit, arranged to selectively perform the second level shifting operation on the first enable signal according to the voltage level of the first enable signal to generate the second enable signal, wherein the second level shifter comprises a set of transistors coupled to each other and coupled between the battery voltage and a ground voltage, to form an inverter in the second level shifter; and
    a resistor, installed on a current path that passes through the set of transistors and is positioned between the battery voltage and the ground voltage, the resistor arranged to limit any possible leakage current on the current path for at least one operation mode of multiple operation modes of the electronic device.

12. The voltage divider circuit of claim 11, wherein the plurality of control signals comprise a power-on reset signal of the electronic device and an isolation signal of a microcontroller of the electronic device, wherein the power-on reset signal is configured to control power-on reset of the electronic device, and the isolation signal is configured to control power isolation of the microcontroller; and the first level shifter circuit comprises:
    at least one logic circuit, arranged to perform logic control according to the power-on reset signal and the isolation signal to generate at least one logic signal;
    at least one switch, coupled to the at least one logic circuit, arranged to operate according to the at least one logic signal to selectively make at least one signal path be conductive; and
    a first level shifter, coupled to the at least one switch, arranged to, under control of the at least one switch, selectively perform the first level shifting operation on the original enable signal to generate the first enable signal;
wherein a multi-stage architecture formed with the first level shifter circuit, the second level shifter circuit, and the controlled voltage divider allows a whole of the voltage divider circuit to be implemented in a chip without need of any external components outside the chip.

13. The voltage divider circuit of claim 1, wherein the controlled voltage divider comprises:
    a set of resistors connected in series, coupled between the battery voltage and a ground voltage, arranged to selectively perform the voltage dividing operation on the battery voltage to generate the divided voltage of the battery voltage to be the output of the voltage divider circuit; and
    a switch, installed on a current path that passes through the set of resistors and is positioned between the battery voltage and the ground voltage, the switch arranged to operate according to the second enable signal to selectively make the current path be conductive.

14. The electronic device equipped with the voltage divider circuit of claim 1, wherein the electronic device further comprises:

a microcontroller, arranged to control operations of the electronic device;
at least one control signal generator, arranged to generate the plurality of control signals; and
at least one power supply circuit, arranged to generate at least the first power voltage.

\* \* \* \* \*